May 30, 1950

A. J. WOOLCOTT 2,509,622

MEANS FOR DELIVERING SPLIT RINGS IN
A PREDETERMINED ANGULAR POSITION

Filed July 2, 1947

Inventor
Arthur J. Woolcott
By
Mawhinney & Mawhinney
Attorneys

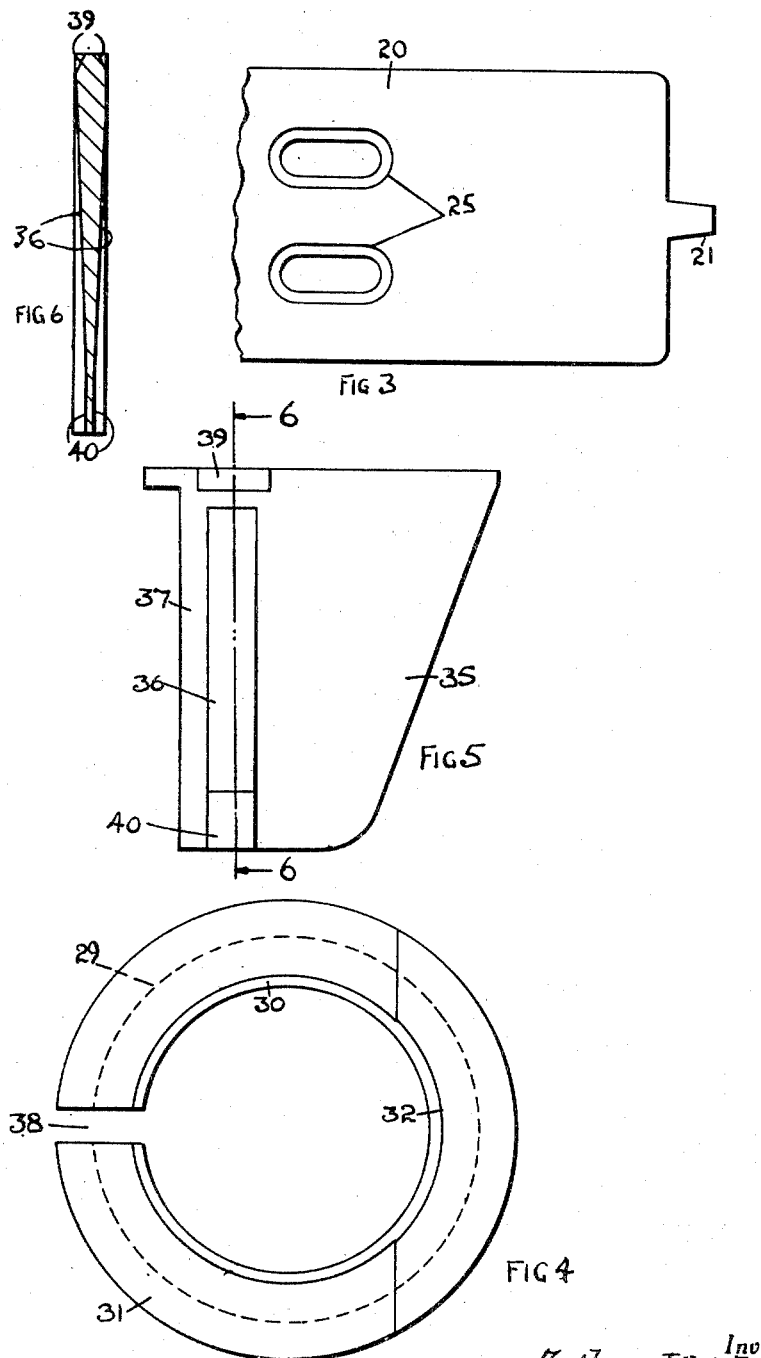

Patented May 30, 1950

2,509,622

UNITED STATES PATENT OFFICE 2,509,622

MEANS FOR DELIVERING SPLIT RINGS IN A PREDETERMINED ANGULAR POSITION

Arthur J. Woolcott, Lymington, England, assignor of one-half to Wellworthy Piston Rings Limited, Lymington, England Application July 2, 1947, Serial No. 758,560
In Great Britain March 11, 1947

5 Claims. (Cl. 214—8.5)

The main object of the invention is to provide means whereby split piston rings or the like can be delivered by a hopper in a predetermined angular position—for example, to an automatic or like machine for carrying out some operation on them. One such automatic machine with which the hopper of the invention can be profitably used is disclosed in the specification of patent application Serial No. 758,559.

According to one feature of the present invention, a hopper, for delivering split rings in a predetermined angular position, comprises opposed guiding faces, at least one of which is concave (for example, of wide V-shape) to the rings, which are relatively adjustable for different-sized rings, and a longitudinally-extending tongue which registers with the gaps of the rings in the hopper.

According to a further feature of the invention, means for delivering split rings in a predetermined angular position comprises a hopper having a longitudinally-extending tongue in it to register with the ring gaps, a slide reciprocable to move the lowermost ring from beneath the hopper to a position in line with a guide having a predetermined taper along it, the slide having a projection to register with the gap, and means for forcing the ring from the slide through the tapered guide to close it to a greater or less extent.

Of the accompanying drawings:

Figure 3 is a plan view, to a larger scale, of that end of the slide which delivers the rings from the hopper to the tapered guide;

Figure 4 is an enlarged, and more detailed, plan view of the latter; and

Figures 5 and 6 are, respectively, a side elevation (to the same scale as Figure 4) of a longitudinally-extending tongue which coacts with the tapered guide, and a sectional view on the line 6—6 of Figure 5.

Figure 1:
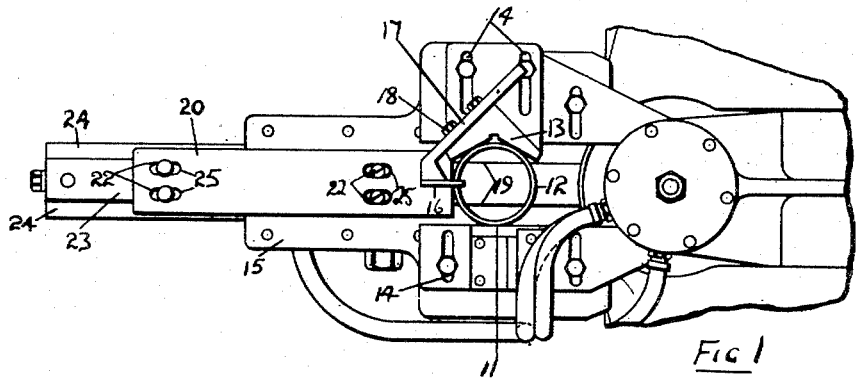
Figure 1 is a plan view of an automatic machine, according to the patent specification aforesaid, equipped with the means according to the present invention.

In the drawings, the automatic machine which, apart from the delivery means, does not form part of the present invention but is described in the aforesaid patent specification, is provided with a hopper, working with gravity feed, comprising a part 11 having a plain upright face to engage one side of each ring 12 and, to engage the opposite side, a wide V-shaped upright member 13, both these members being adjustably mounted, as by bolt-and-slot connections 14, upon an appropriate base 15 and serving to provide location for a stack of rings. A longitudinally-extending tongue 16 registers with the gaps of the rings so as to maintain them in a predetermined angular position in the hopper. The tongue is conveniently adjustably supported, as shown, by a bar 17 or the like secured by bolt-and-slot connections, indicated at 18, to an inclined rear face of the V-shaped upright 13.

Figure 2:
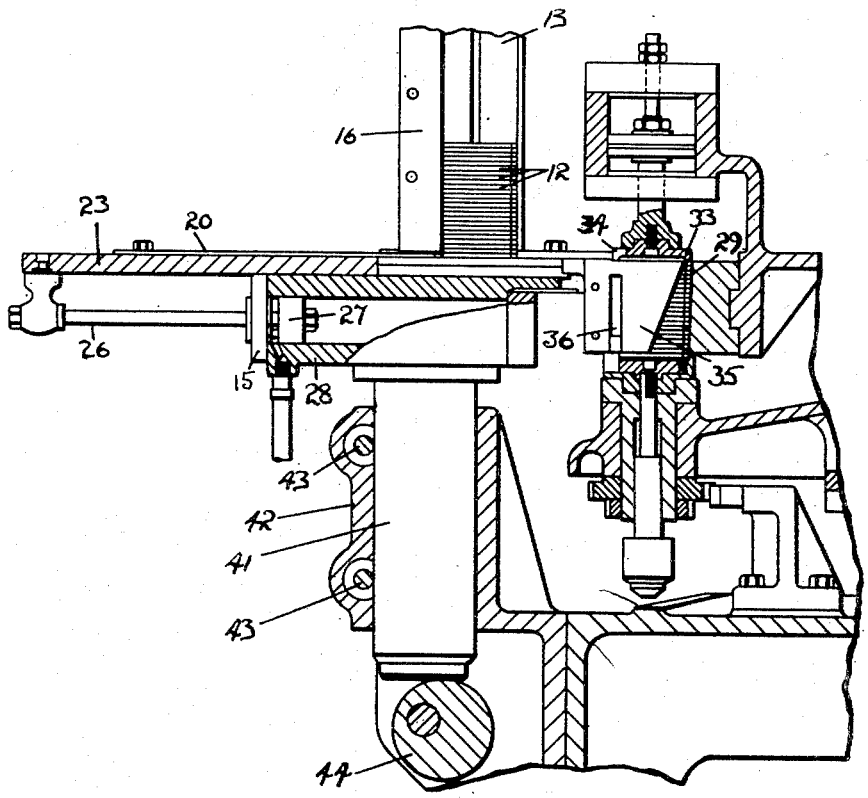
Figure 2 is a vertical longitudinal section corresponding with Figure 1.

The lowermost ring of the stack rests on two spaced cheeks 19 of the frame (Figure 1), and disposed beneath the hopper is a slide 20 which, when withdrawn, can receive the lowermost ring ahead of it, the slide having a projection 21 (see Figure 3) to register with the gap in the ring. Any suitable provision is made for adjusting the guide for the slide relatively to the lower end of the hopper dependently upon the axial thickness of the rings to be treated. For instance, as shown by Figure 2, the base 15 (by which the main slide 23 is supported) is held in vertical guides (not shown) and has a pillar 41, which may be non-circular in cross-section, held in a split guide 42 by tightening bolts 43, the height of the slide being adjustable by a rotatable cam 44 which reacts on the foot of the pillar.

Preferably the slide 20, which is of the same thickness as the ring (or slightly thinner) is mounted by screws 22 (which may be countersunk) on a main slide 23, the latter having dovetail guides 24 engaging beneath the cheeks 19 (which latter may be of any appropriate length). In this way the slide 20 can be substituted when rings of a different thickness are to be inserted into the hopper. Preferably, also, the bolts 22 pass through slots 25 in the slide so that adjustment can be made to suit rings of a different diameter.

Having received the lowermost ring the slide 20 can be slid, for example, by the rod 26 of a piston 27 working in a pneumatic cylinder 28, to push the said lowermost ring to a position above a vertical guide 29 having a slight downward taper, indicated at 30, along its length (see Figure 4) such that, when the ring is forced along the tapered guide, it will be closed to a greater or less extent as desired. The guide 29 has a radial flange 31 for its axial location in the machine and it has a raised portion 32 which correctly positions a ring concentrically when the latter is fed by the slide 20.

For forcing the ring through the guide use may be made of a pneumatically-operated plunger 33 having a slot 34 on one side to receive the projection 21 of the slide whilst forcing the ring into the tapered guide.

Conveniently, the tapered guide 29 normally carries a stack of rings, and on the appropriate side (i. e., where the gaps are) there is a longitudinally-extending tongue 35 to register with the ring gaps, this tongue, in the zone of the gaps, tapering in thickness along its length as shown at 36 according to the narrowing of the gaps of the rings in the tapered guide. The tongue 35 is held, in any suitable manner, by the parallel-sided portion 37 in a parallel-sided longitudinal slot 38 of the guide 29, so as to project diametrically part-way across the latter. The tongue, in alignment with the tapered part 36, is preferably chamfered at 39 to facilitate the introduction of the rings into the guide, and the lower end of the tapered part 36 may terminate in a parallel-sided part 40 of a thickness depending on a desired compression of the rings at the bottom of the guide.

The lowermost ring, when the plunger adds a new ring to the stack, will be ejected from the lower end of the guide into an appropriate receiver.

What I claim as my invention and desire to secure by Letters Patent of the United States is:

1. A device for delivering split rings with their respective gaps in a predetermined angular position comprising a support, a hopper on said support for receiving a supply of split rings, a tongue extending longitudinally of the hopper and thereinto for engagement by the gaps of the rings, a ring guide carried by said support and having a predetermined tapered bore spaced from said hopper, a slide transversely reciprocable on said support at the foot of said hopper, means carried by said support for driving said slide for transferring the lowermost ring in said hopper to said tapered guide, a projection on said slide to engage in the gap of the lowermost ring in said hopper during the transfer movement, means axially above said ring guide for forcing the transferred ring through said tapered guide so as to urge the ring-ends, which define said gap, towards each other, and a radially-inwardly extending tongue within said tapered ring guide to engage in the gap of said transferred ring, the width of said tongue diminishing towards the bottom correspondingly to the diminution of the gap of the transferred ring.

2. A device as claimed in claim 1 wherein the hopper on said support comprises two relatively movable members one of which is of wide V-shape in cross section and the other of which is provided with a substantially flat surface for urging the rings into contact with two of the arms of the V-shaped member.

3. A device as claimed in claim 2 wherein the said tongue within said tapered ring guide is chamfered at the top, in alignment with the tapered portion thereof.

4. A device as claimed in claim 3 characterized by the fact that the tongue within said tapered ring guide is provided with tapering walls with the larger end at the top and the smaller end at the bottom for guiding the rings being forced through the guide while the gap between the rings is being reduced due to the tapered bore of the guide.

5. A device for delivering split rings with their respective gaps in a predetermined angular position comprising a support, a hopper on said support, a tongue extending longitudinally of the hopper and thereinto for engagement with the gaps of the rings, a ring guide having a predetermined tapered bore in axial alignment with but spaced from said hopper, a slide carried by said support and transversely reciprocable at the foot of said hopper, means for driving said slide for transferring the lowermost ring in said hopper to said tapered guide, a projection on said slide to engage in the gap of the lowermost ring during the transfer movement, and means vertically above said ring guide for forcing the transferred ring through said tapered guide so as to urge the ring ends towards each other.

ARTHUR J. WOOLCOTT.

REFERENCES CITED

The following references are of record in the file of this patent:

UNITED STATES PATENTS

| Number | Name | Date |
| --- | --- | --- |
| 2,288,031 | Schaefer et al. | June 30, 1942 |
| 2,297,847 | Wilckens et al. | Oct. 6, 1942 |
| 2,444,232 | Shanklin et al. | June 29, 1948 |